Mar. 27, 1923.  1,450,070.
J. FULLER.
COMBINED FERTILIZER DISTRIBUTOR AND PLANTER.
FILED OCT. 1, 1921.
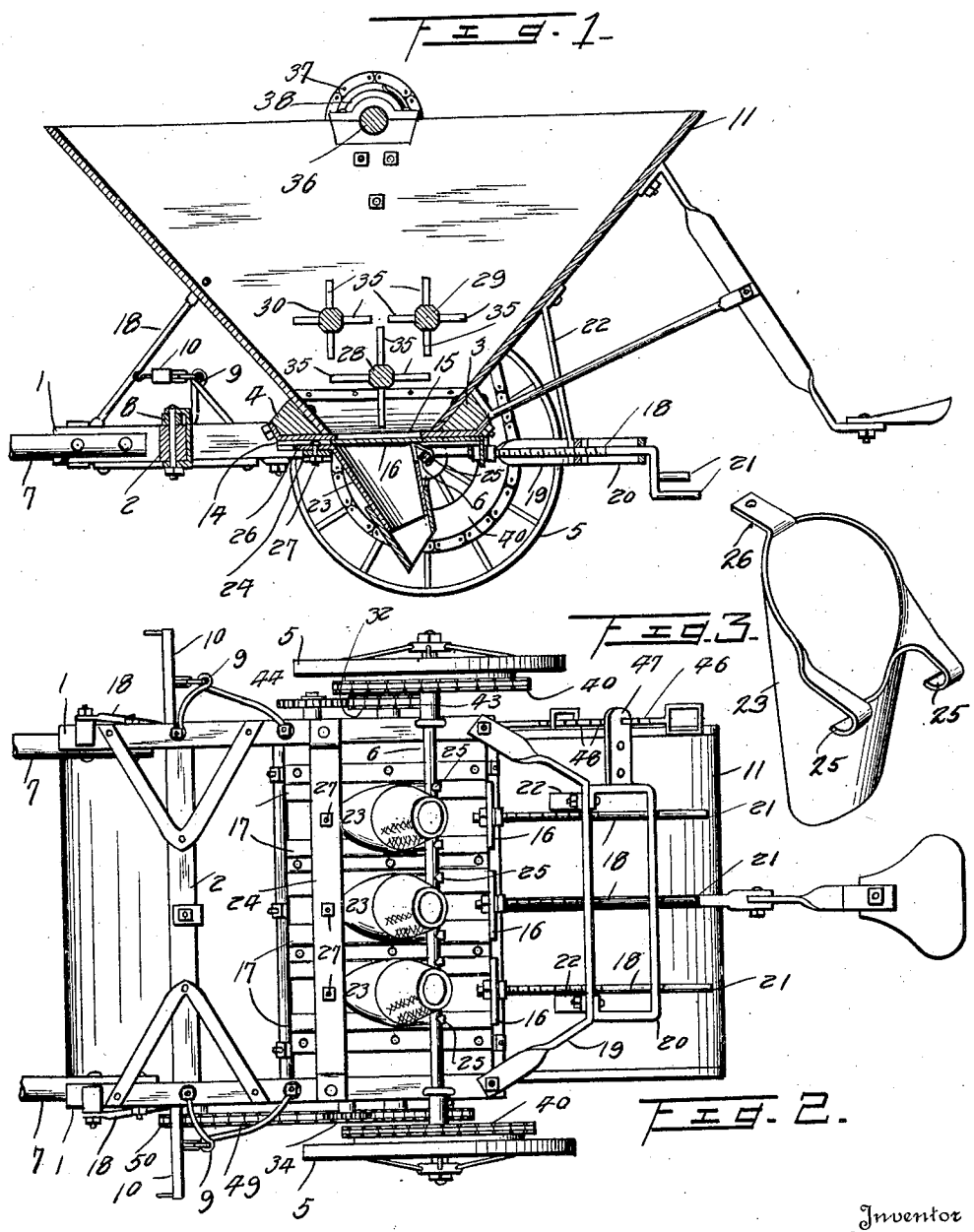
Inventor
J. Fuller

Patented Mar. 27, 1923.

1,450,070

UNITED STATES PATENT OFFICE.

JOE FULLER, OF SUMRALL, MISSISSIPPI.

COMBINED FERTILIZER DISTRIBUTOR AND PLANTER.

Application filed October 1, 1921. Serial No. 504,586.

*To all whom it may concern:*

Be it known that I, JOE FULLER, a citizen of the United States, residing at Sumrall, in the county of Lamar and State of Mississippi, have invented certain new and useful Improvements in Combined Fertilizer Distributors and Planters; and I do hereby declare the following to be a full, clear, and exact description of the invention, such as will enable others skilled in the art to which it appertains to make and use the same.

The invention has for its primary object the provision of an agricultural implement whereby fertilizer, such as barn compost, may be successfully distributed without choking the machine or being discharged in lumps.

The invention also aims to provide a machine whereby any commercial fertilizer or seed, such as cotton, corn, peas and the like may be distributed broadcast or in drills variously spaced as required.

The machine embodies a hopper of peculiar formation for receiving the fertilizer or seed in bulk, rotary agitators in the hopper for preventing the banking of the material therein and for lightening, separating and positively feeding compost and cotton seed, means for regulating the discharge from the hopper, adjustable boots or spouts for conveying the material from the hopper into furrows when it is required to drill the same and operating means for the agitators.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a vertical, central longitudinal section of a combined fertilizer distributor and planter embodying the invention, Figure 2 is an inverted view of the machine, and Figure 3 is a detail perspective view of one of the boots or spouts.

Corresponding and like parts are referred to in the following description and designated in the several views of the drawings by like reference characters.

The supporting frame may be of any construction and as shown comprises longitudinal bars 1, front and rear cross bars 2 and 3, respectively, and an intermediate cross bar 4. Ground wheels 5 support the machine and are loosely mounted upon the arms of a fixed axle 6. Shafts or thills 7 project forwardly from the longitudinal bars 1 and are adapted to have a horse harnessed thereto in a manner well understood whereby the machine may be drawn over the field. A single tree 8 is mounted upon the cross bar 2 and is adapted to have the horse hitched thereto. Brackets 9 project laterally from the longitudinal bars 1 and receive single trees 10 at their outer ends whereby additional horses may be hitched to the machine when required. One or both of the brackets 9 may be detached when not required for use.

A hopper 11 is mounted upon the frame and its sides are vertical and parallel whereby its front and rear slope inwardly and downwardly to provide a contracted bottom through which the material is discharged. The hopper may be of any preferred construction and one of its sides is made detachable whereby provision is had for placing the agitators in position or removing them as required. The hopper is strengthened by means of braces 18 which are interposed between it and the longitudinal bars 1.

The bottom 14 of the hopper 11 preferably consists of metal and is secured to the cross bars 3 and 4, tapering openings 15 are formed in the bottom 14 at intervals in its length and are disposed with their pointed ends facing forwardly. Slides 16 are adapted to close the openings 15 and regulate their respective size to control the discharge of the material. The slides 16 operate suitable guides formed by strips 17 attached to the lower side of the bottom 14. The openings 15 are uncovered by a rearward movement of the slides 16 and are closed by a forward movement of said slides. By reason of the tapered formation of the openings 15 and their relative disposition the relative size of the openings vary according to the relative position of the slides. As the slides 16 move rearwardly the openings 15 proportionately increase and as the slides 16 move forwardly the respective size of the openings 15 proportionately increase. A threaded rod 18 cooperates with each of the slides 16 and is connected thereto by means of a swivel joint. A bail 19 attached at its ends to the longitudinal bars 1 receives the rods 18 which have a screw threaded connection therewith. A bracket 20 attached to the bail 19 receives the rear ends of the rods 18 which are loosely mounted therein. The threaded rods 18 may be rotated in any convenient way and as shown each is provided with a crank handle 21. Braces 22 are interposed between the hopper 11 and the bail 19 to strengthen it and the bracket 20.

Boots or spouts 23 are provided for conveying the material from the hopper to the furrows. These boots or spouts may be of any preferred construction and are applied in such a manner as to be readily detached or adjusted to meet requirements. A cross bar 24 disposed beneath the forward portion of the hopper bottom 14 is attached at its ends to the longitudinal bars 1 and in conjunction with the axle 6 forms a support for the boots or spouts 23. Hooks 25 projecting rearwardly from the upper end of each boot or spout 23 are adapted to engage the axle 6. An extension 26 projecting forwardly from the upper end of the boot or spout 23 is adapted to engage the cross bar 24 to which it is made fast in the adjusted position by means of a bolt 27 or other suitable fastening means. When the material is to be distributed broad cast the boots or spouts 23 are removed. When the material is to be distributed in drills, the boots or spouts 23 are placed in position according to the required distance between the rows. The tapering openings 15 may be closed and other openings uncovered more or less as required. The boots or spouts 23 are applied to such discharge openings as are uncovered thereby to drill the material from the hopper in rows the required distance apart.

A plurality of rotary agitators are located within the lower portion of the hopper 11, each consisting of a shaft and blades or teeth radiating from the shaft and disposed at intervals in the length thereof. In the present instance three rotary agitators are provided, one being located centrally of the hopper adjacent the bottom thereof and the other two being located in a higher plane, the one forwardly and the other rearwardly of a vertical plane passing through the axis of the lower agitator. The shaft 28 of the lower agitator has its ends projecting beyond opposite sides of the hopper and provided with sprocket wheels 31 and 32 which are fast thereto. The shaft 29 of the upper rear agitator has one end projecting beyond the right hand side of the hopper and provided with a sprocket wheel 33 which is fast thereto. The shaft 30 of the upper forward agitator extends at one end beyond the right hand side of the hopper and is provided with a sprocket wheel 34 fast thereto. The shafts 28 and 29 rotate in the same direction, whereas the shaft 30 rotates in a reverse direction. The teeth or blades 35 of the several shafts have an approximate staggered relation to insure a thorough loosening, lightening and separating of the material in the hopper whereby an even and positive delivery thereof is assured. The teeth 35 are of like formation and are preferably broad and flat and disposed with their broad sides in the plane of rotation so as to pass readily through the material in the hopper and loosen and separate the same. The forward portion of the teeth 35 may be relatively sharp so as to separate barn compost and insure a positive and uniform delivery thereof. The several agitators may be readily placed in position or removed from the hopper by the provision of the detachable side 12 as herein stated.

A counter shaft 36 is mounted upon the hopper 11 and projects beyond opposite sides thereof and has sprocket wheels 37 loosely mounted thereon and connected therewith by means of a ratchet mechanism such as a pawl 38 and teeth 39, each of the sprocket wheels 37 being provided with a pawl 38 and the shaft 36 having teeth 39 to cooperate with the pawl 38. A sprocket 40 is secured to a side of each of the ground wheels 5 and a sprocket chain 41 connects the sprocket wheels 37 and 40 whereby to impart movement to the counter shaft 36. A sprocket wheel 42 fast to an end portion of the counter shaft 36 is connected by means of a sprocket chain 43 with the sprocket wheel 32 of the shaft 28 of the lower agitator. A sprocket idler 44 cooperates with the sprocket chain 43 to tension the same. A pivoted arm 45 carries the sprocket idler 44 and is operable by means of a bar 46 extending along the side of the hopper 11 so as to be readily accessible from the driver's seat. The bar 46 is held in the adjusted position by means of a stop 47 adapted to engage one of a series of teeth 48 formed on the bar 46. A sprocket chain 49 engages the sprocket wheel 31 of the lower agitator shaft 28 and the sprocket wheels 33 and 34 of the respective shafts 29 and 30 of the upper agitators. A sprocket idler 50 engages the sprocket chain 49 mounted upon an adjustable bracket 51 adapted to be secured to the side of the hopper 11 in the required adjusted position by means of screws 52 or like fastening means.

Having thus described the invention, what I claim is:—

A combined fertilizer distributor and planter comprising a supporting frame, an axle applied thereto and provided with ground wheels, a crossbar spaced from the axle, a hopper mounted upon the frame above the axle and cross bar and having a plurality of discharge openings in its bottom intermediate the crossbar and axle, means for closing the discharge openings and boots having opposed projections adapted to engage the said axle and cross bar whereby to retain the boots in the required adjusted position.

In testimony whereof I affix my signature in presence of two witnesses.

JOE FULLER.

Witnesses:
J. S. TEMPLE,
W. E. JONES.